United States Patent
Nakashima et al.

(10) Patent No.: US 12,428,791 B2
(45) Date of Patent: Sep. 30, 2025

(54) INFORMATION PROCESSING DEVICE, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Toyokazu Nakashima, Nagoya (JP); Shunsuke Sagara, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 438 days.

(21) Appl. No.: 18/058,906

(22) Filed: Nov. 28, 2022

(65) Prior Publication Data
US 2023/0257943 A1 Aug. 17, 2023

(30) Foreign Application Priority Data
Feb. 15, 2022 (JP) .................. 2022-021633

(51) Int. Cl.
*E01C 23/01* (2006.01)
*G01C 7/04* (2006.01)

(52) U.S. Cl.
CPC ............ *E01C 23/01* (2013.01); *G01C 7/04* (2013.01)

(58) Field of Classification Search
CPC .......... E01C 23/01; G01C 7/04; G06Q 50/40; G06Q 10/20; G06Q 10/06; G06Q 50/08; B60W 2050/0057; B60W 2422/40; B60W 2756/10; B60W 40/06; G01S 19/14; G01S 19/37
See application file for complete search history.

(56) References Cited

U.S. PATENT DOCUMENTS

2016/0356001 A1* 12/2016 Shimada .............. G06V 20/588

FOREIGN PATENT DOCUMENTS

| CN | 110103843 | * | 10/2006 | .............. F16F 15/04 |
| CN | 106062844 | A | 10/2016 | |
| CN | 111504436 | A | 8/2020 | |
| JP | 2006277007 | * | 10/2006 | .............. G05D 1/08 |
| JP | 2006277007 | A | 10/2006 | |
| JP | 2017218832 | * | 12/2017 | .............. E02D 1/00 |
| JP | 2020020740 | A | 2/2020 | |
| JP | 2022012710 | A | 1/2022 | |
| WO | 2015/141267 | A1 | 9/2015 | |

OTHER PUBLICATIONS

Laurie G. Baise et al., "Collaborative Research with Tufts University and University of Alaska Fairbanks: Application of Satellite Data for Post-liquefaction Reconnaissance", Department of Geological and Mining Engineering and Sciences, Michigan Technological University, Houghton, MI 49931, USA, 2010, p. 22.*

* cited by examiner

*Primary Examiner* — Alexander Satanovsky
(74) *Attorney, Agent, or Firm* — Dickinson Wright, PLLC

(57) ABSTRACT

The information processing device determines an observation target region to be observed by the artificial satellite 4 on the basis of information on vibration during traveling of the vehicle. Then, the information processing device determines whether or not a liquefaction phenomenon has occurred based on the data obtained by observing the observation target region by the artificial satellite.

3 Claims, 8 Drawing Sheets

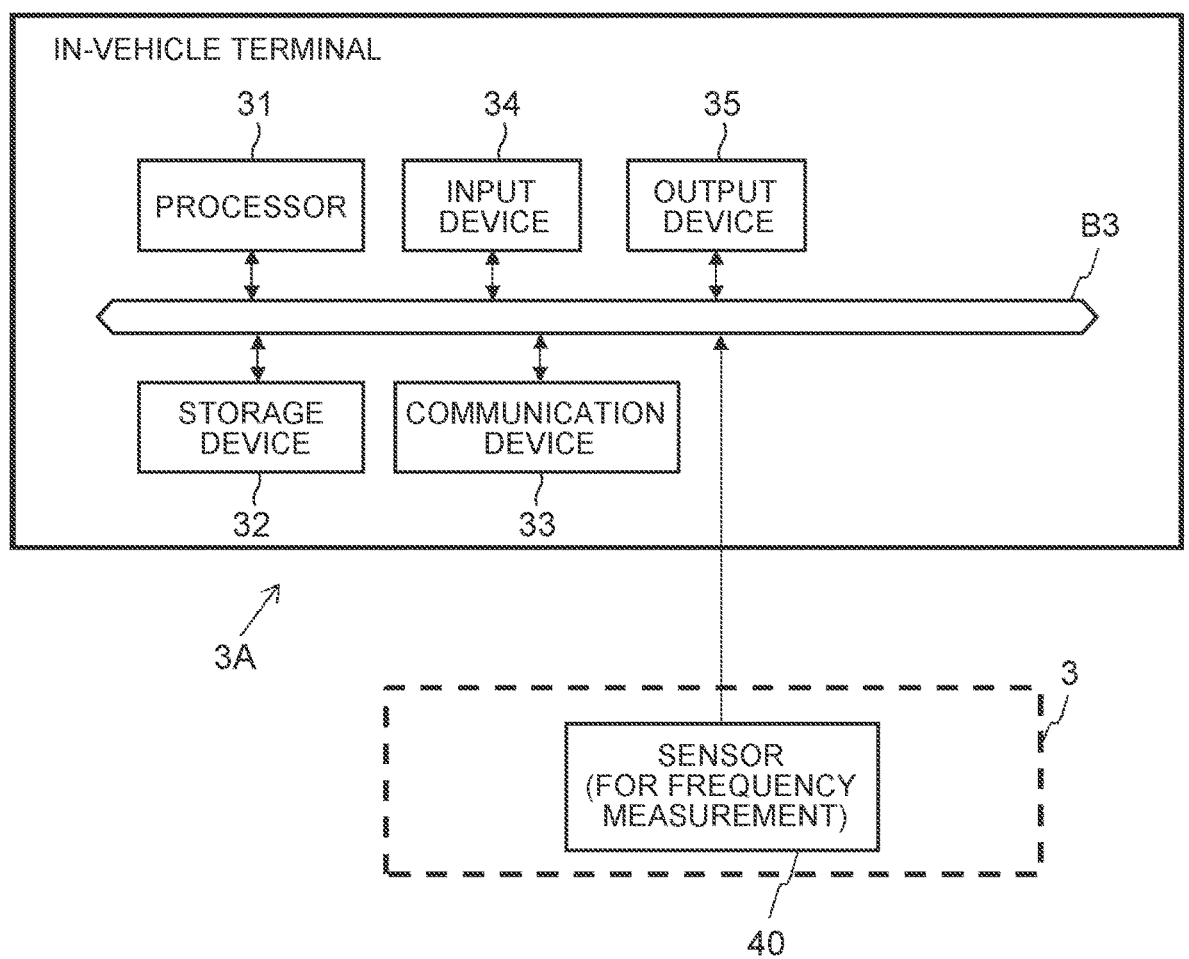

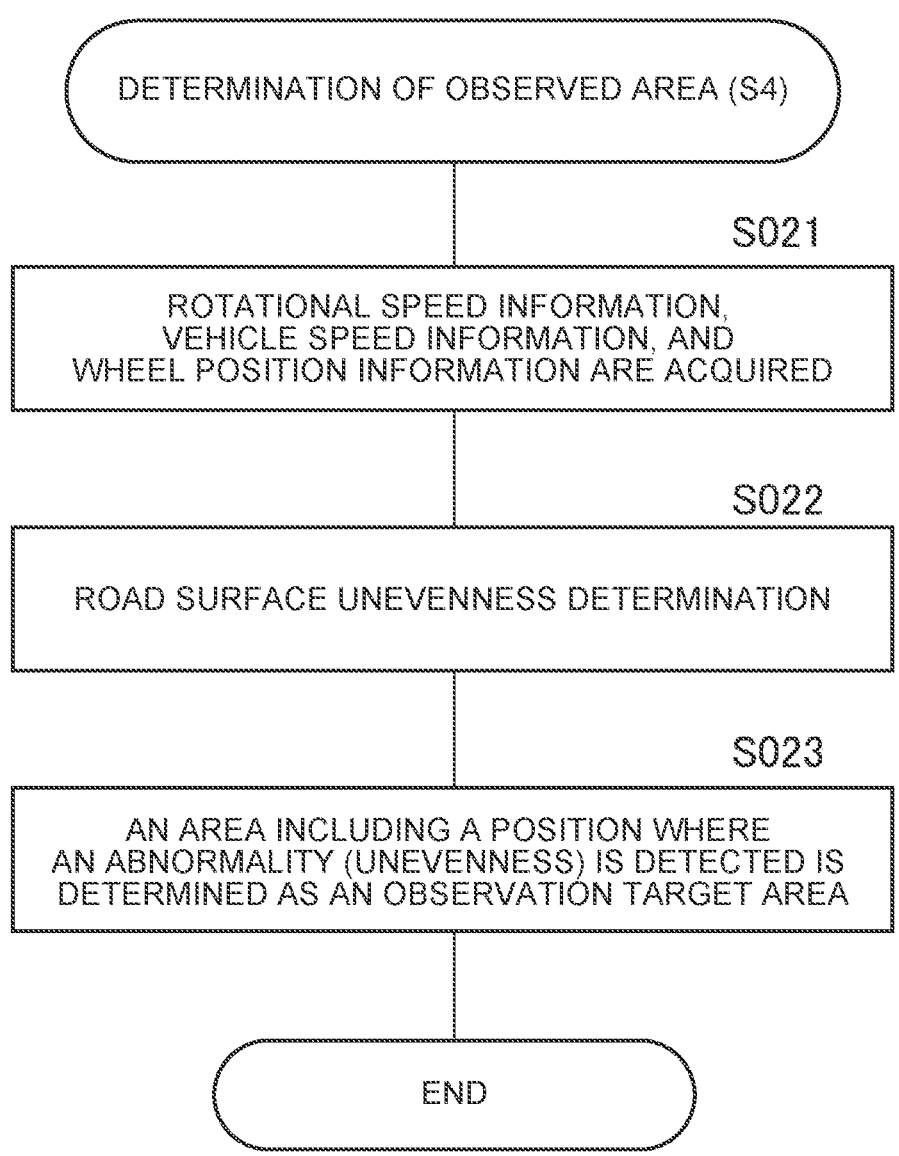

INFORMATION PROCESSING DEVICE, INFORMATION PROCESSING METHOD, AND NON-TRANSITORY STORAGE MEDIUM

CROSS-REFERENCE TO RELATED APPLICATION

This application claims priority to Japanese Patent Application No. 2022-021633 filed on Feb. 15, 2022, incorporated herein by reference in its entirety.

BACKGROUND

1. Technical Field

The present disclosure relates to an information processing device, an information processing method, and a non-transitory storage medium.

2. Description of Related Art

Conventionally, there is a technique for enhancing transmission efficiency by extracting only a region required for comparison with a reference image from an image captured by an imaging device mounted on a satellite, and transmitting data indicating the difference between the reference image (for example, Japanese Unexamined Patent Application Publication No. 2006-277007 (JP 2006-277007 A)).

SUMMARY

An object of the present disclosure is to provide a technique capable of suitably detecting the occurrence of a liquefaction phenomenon.

An aspect of the present disclosure is an information processing device including a control unit that decides an observation target region to be observed by an artificial satellite based on information on vibration during traveling of a vehicle, and determines whether a liquefaction phenomenon has occurred based on data obtained by observing the observation target region with the artificial satellite.

Another aspect of the present disclosure is an information processing method including: deciding, by an information processing device, an observation target region to be observed by an artificial satellite based on information on vibration during traveling of a vehicle; and determining, by the information processing device, whether a liquefaction phenomenon has occurred based on data obtained by observing the observation target region with the artificial satellite.

Still another aspect of the present disclosure is a program that causes a computer to execute the above-described information processing method, or a computer-readable storage medium storing the program in a non-transitory manner.

According to the present disclosure, it is possible to suitably detect the occurrence of a liquefaction phenomenon.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a diagram illustrating a configuration example of an in-vehicle terminal;

FIG. 8 is a flowchart illustrating a determination process of an observation target measurement region according to a modification.

DETAILED DESCRIPTION OF EMBODIMENTS

In the embodiment, an information processing device including a control unit will be described. The control unit is configured to acquire information related to vibration during traveling of the vehicle, and determine a predetermined region to be observed by the artificial satellite based on the information related to vibration during traveling. The control unit is further configured to determine whether a liquefaction phenomenon has occurred based on the data obtained by observing the predetermined region by the artificial satellite.

The information processing device detects a portion where a liquefaction phenomenon is likely to occur based on the vibration acquired from the vehicle, and further checks the portion where the liquefaction phenomenon is likely to occur with data observed by the satellite to determine whether or not the liquefaction phenomenon has occurred. This is because the absolute value of the height of the road surface is not known although the frequency is known in the vehicle. For example, it is very difficult to distinguish between softening and liquefaction of asphalt. However, if the data observed by the artificial satellite is further used, it can be seen that the absolute height of the ground surface due to liquefaction changes. Therefore, it is possible to distinguish between softening and liquefaction of asphalt. That is, the liquefaction phenomenon can be suitably detected.

Hereinafter, an information processing device, an information processing method, and a program according to an embodiment will be described with reference to the drawings. The configurations of the embodiment are shown as examples.

Figure 1:
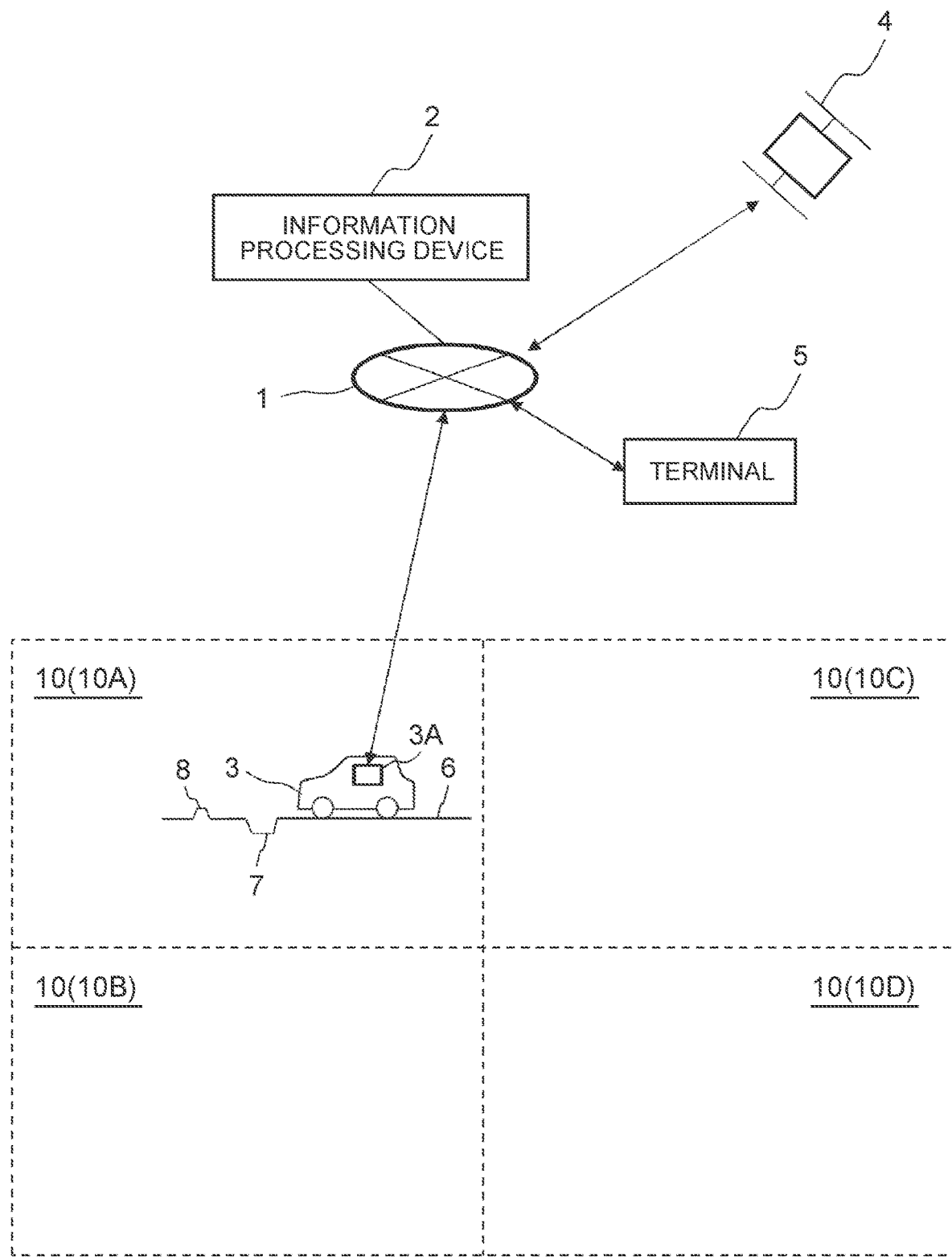
FIG. 1 is a diagram illustrating a configuration example of an information processing system according to an embodiment.

FIG. 1 is a diagram illustrating a configuration example of an information processing system according to an embodiment; In FIG. 1, the information processing system includes a network 1, an information processing device (server) 2, an in-vehicle terminal 3A mounted on the vehicle 3, satellites 4, and a terminal 5.

The network 1 is a public network such as the Internet. The network 1 may include a wireless section. The information processing device 2 can communicate with the in-vehicle terminal 3A, the artificial satellites 4, and the terminal 5 via the network 1. The in-vehicle terminal 3A transmits information (referred to as vibration-related information) related to vibration of the vehicle 3 traveling on the road 6 to the information processing device 2 via the network 1.

The vibration-related information may include, for example, information indicating the frequency of the vehicle 3 and position information of the vehicle 3. Alternatively, the vibration-related information may include information correlated with the deformation of the road 6 and position information of the vehicle. The deformation of the road 6 is, for example, an abnormality (unevenness) of the road 6 such as the depression 7 or the ridge 8 of the road 6.

The information processing device 2 determines (specifies) a region (referred to as an observation target region) to be observed by the artificial satellite 4 based on vibration-related information received from the vehicle 3 (which may be other than the vehicle 3).

The observation target region is determined, for example, as follows. The ground surface is partitioned into a plurality of areas of a rectangle, a regular hexagon, or a regular octagon. FIG. 1 illustrates an area 10 (10A to 10D) partitioned into rectangles. Then, the area 10 (the area 10A in FIG. 1) including the road 6 determined as the observation target based on the vibration-related information from the vehicle 3 is identified as the observation target area.

The artificial satellite 4 is, for example, an artificial satellite including a synthetic aperture radar (SAR), and generates image data obtained by observing an area including an observation target area specified by the information processing device 2 in accordance with an instruction (command) from the information processing device 2. The image data is data indicating the terrain of the corresponding area and the height thereof (the altitude of each point), and it is possible to observe the terrain displacement at the place where the predetermined unevenness based on the vibration-related information is generated. The artificial satellite 4 transmits image data to the information processing device 2 via the network 1.

The image data is an example of "data observed by an artificial satellite" (referred to as observation data). However, the data observed by the artificial satellite 4 may be other than the image data. The artificial satellite 4 may generate observation data using an optical sensor other than the SAR or a microwave sensor.

The information processing device 2 determines whether or not a liquefaction phenomenon has occurred based on the observation data. For example, the information processing device 2 analyzes the image data, and transmits the image data to the terminal 5 when it is determined that a liquefaction phenomenon has occurred in the analysis result. In this case, when the analysis result does not indicate the occurrence of the liquefaction phenomenon, it is possible to avoid transmitting the image data to the terminal 5.

The terminal 5 is a terminal 5 for road management used by an administrator of the road 6. The terminal 5 can display an image based on the image data. The administrator of the road 6 can use the image as a material of the liquefaction phenomenon.

Figure 2A:
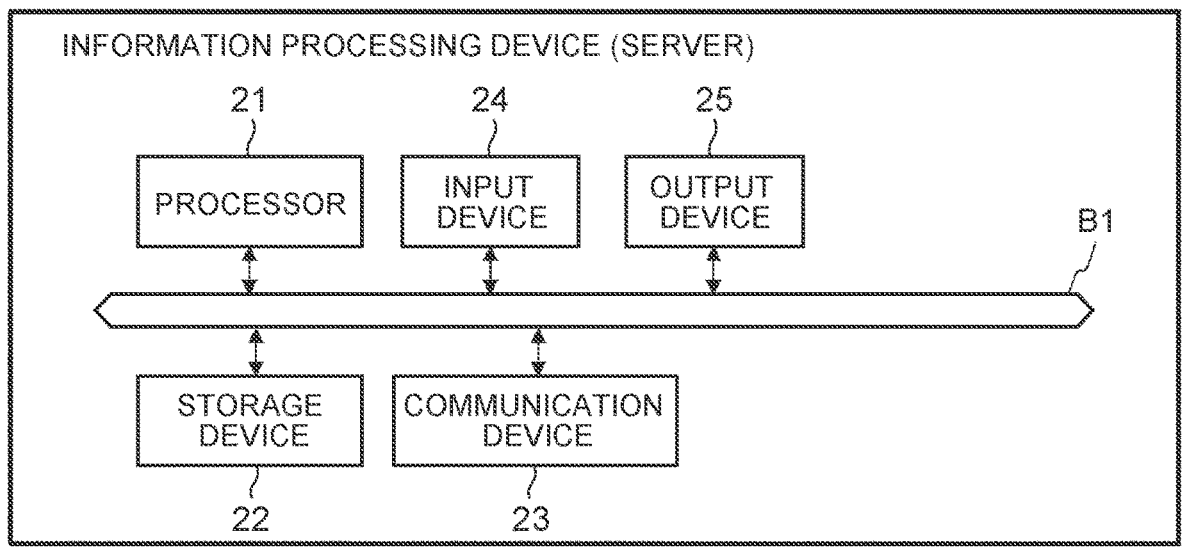
FIG. 2A is a diagram illustrating a configuration example of an information processing device.
Figure 2B:
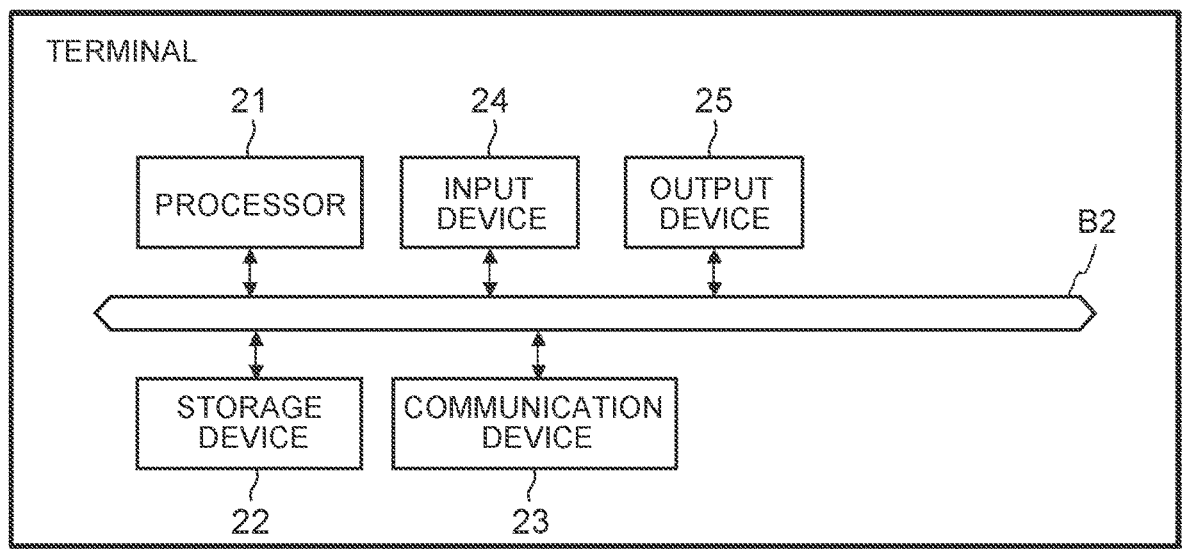
FIG. 2B is a diagram illustrating a configuration example of a terminal.

FIG. 2A is a diagram illustrating a configuration example of the information processing device 2, and FIG. 2B is a diagram illustrating a configuration example of the terminal 5. The information processing device 2 and the terminal 5 are general-purpose or special-purpose computers such as a personal computer (PC), a workstation (WS), or a server machine. The information processing device 2 and the terminal 5 may be fixed terminals or portable terminals. The portable terminal is a laptop PC, a smart device (such as a smartphone and a tablet terminal), or the like, but is not limited to the example. The information processing device 2 may be one information processing device or a set of two or more information processing devices (cloud).

In FIG. 2A, the information processing device 2 includes a processor 21 as a processing unit or a control unit (control unit), a storage device 22, a communication device 23, an input device 24, and an output device 25, which are connected to each other via a bus B1.

The storage device 22 includes a main storage device and an auxiliary storage device. The main storage device is used as a storage area for programs and data, a deployment area for programs, a work area for programs, and a buffer area for communication data. The main storage device is composed of a random access memory (RAM) or a combination of a RAM and a read only memory (ROM). The auxiliary storage device is used as a storage area for data and programs. Non-volatile storage media such as hard disks, Solid State Drive (SSDs), flash memories, and Electrically Erasable Programmable Read-Only Memory (EEPROM), for example, can be used as the secondary storage device.

The communication device 23 is a circuit that performs communication processing, and operates as a transmission unit and a reception unit (communication unit). For example, the communication device 23 is a network interface card (NIC). Further, the communication device 23 may be a wireless communication circuit that performs wireless communication (LTE, 5G, wireless LAN (Wi-Fi), BLE, etc.). The communication device may be a combination of a NIC and a wireless communication circuit.

The input device 24 includes a key, a button, a pointing device, a touch panel, and the like, and is used for inputting information. The input device 24 may include a microphone (voice input device). The output device 25 is, for example, a liquid crystal display or an organic EL display, and displays information and data. The output device 25 may include a speaker (audio output device).

The processor 21 is, for example, a central processing unit (CPU) or the like. The processor 21 performs various processes by executing various programs stored in the storage device 22. For example, the processor 21 executes a process of acquiring vibration-related information from the in-vehicle terminal 3A of the vehicle 3 and a process of determining an observation target area based on the vibration-related information. Further, the processor 21 executes a process of transmitting a command (instruction) for observing an observation target region to the artificial satellite 4, a process of receiving and analyzing observation data (image data) from the artificial satellite 4, and a process of transmitting (notifying) information indicating occurrence of a liquefaction phenomenon to the terminal 5.

Similarly to the information processing device 2, the terminal 5 includes a processor 21 connected to the bus B2, a storage device 22, a communication device 23, an input device 24, and an output device 25. However, devices having different specifications or performance may be applied depending on the purpose of processing or the magnitude of the load. The processor 21 of the terminal 5 performs notification (output) of information indicating occurrence of a liquefaction phenomenon using the output device 25. For example, display control of the output device 25 (display) is performed, and a process of displaying an image or the like based on data received from the information processing device 2 on the display is executed.

FIG. 3 is a diagram illustrating an exemplary configuration of an in-vehicle terminal 3A. The in-vehicle terminal 3A includes a processor 31 connected to a bus B3, a storage device 32, a communication device 33, an input device 34, and an output device 35. The processor 31, the storage device 32, the communication device 33, the input device 34, and the output device 35 may be the same as those of the processor 21, the storage device 22, the communication device 23, the input device 24, and the output device 25. However, the specifications and performance of the same type of apparatus differ depending on the application and load. The communication device 33 is constituted by a wireless communication circuit.

The in-vehicle terminal 3A receives information/data from the sensor 40 or the like mounted on the vehicle 3. The sensor 40 is a sensor that measures the frequency of the vehicle 3. The sensor 40 is mounted on, for example, a damper included in the vehicle 3, and measures the frequency of the damper as the frequency of the vehicle 3. However, the attachment point of the sensor 40 is not limited to the damper, and may be attached to a component other than the damper as long as the frequency correlates with the frequency of the damper, for example, can be obtained.

The processor 31 of the in-vehicle terminal 3A executes the above-described process of acquiring the frequency of the damper by executing the program stored in the storage device 32. Then, the processor 31 generates vibration-related information including the acquired information, and executes a process of transmitting the vibration-related information to the information processing device 2 via the network 1.

Note that a plurality of CPUs may be used as the above-described processors 21 and 31, or a multi-core CPU may be used. At least a part of the processes performed by the CPU may be performed by a processor other than the CPU such as a digital signal processor (DSP) or a graphical processing unit (GPU). Further, at least a part of the processes performed by the CPU may be performed by a dedicated or a general-purpose integrated circuit (hardware). The integrated circuit includes an application-specific integrated circuit (ASIC) or a field-programmable gate array (FPGA). Alternatively, at least a part of the processes performed by the CPU may be executed by a combination of the processor and the integrated circuit. The combination is called, for example, a microcontrol unit (MCU), a system-on-a-chip (SoC), a system large-scale integration (LSI), a chipset, or the like.

Figure 4:
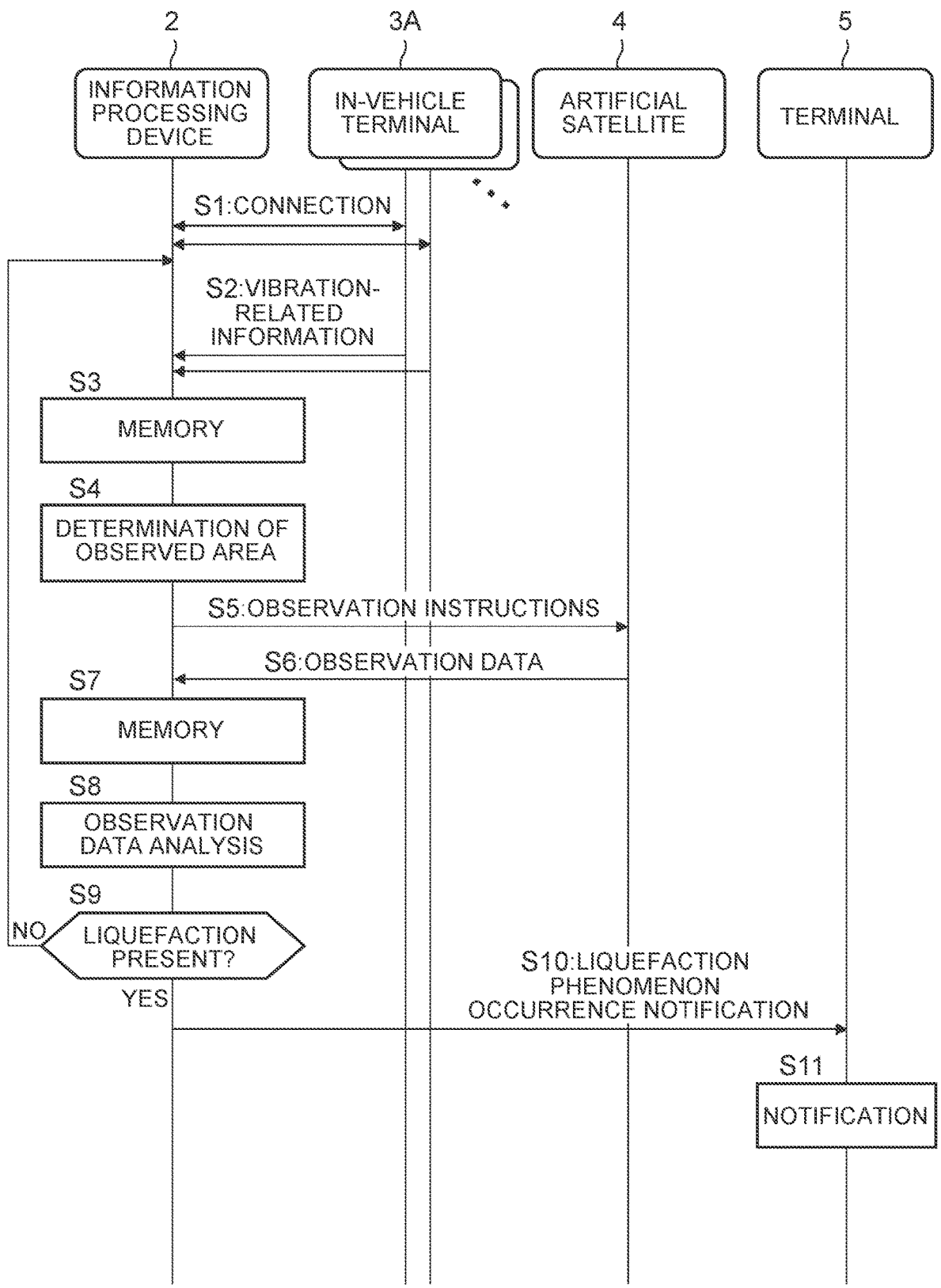
FIG. 4 is a sequence diagram illustrating an operation example of the information processing system.

FIG. 4 is a sequence diagram illustrating an operation example of the information processing system. The information processing device 2 establishes a communication line with one or more in-vehicle terminal 3A (step S1). Each of the in-vehicle terminal 3A transmits the vibration-related information to the information processing device 2 (step S2). The vibration-related information includes at least a frequency of the vehicle 3 and a position of the vehicle 3 (a measurement position of the frequency) at which the frequency is measured. The timing of transmission of the vibration-related information can be set as appropriate. For example, the vibration-related information may be transmitted in response to a request from the information processing device 2, or may be transmitted periodically or periodically by the in-vehicle terminal 3A.

The processor 21 of the information processing device 2 stores the vibration-related information received from each of the in-vehicle terminal 3A in the storage device 22 (step S3). The storage device 22 is an example of a "storage unit".

Figure 5:
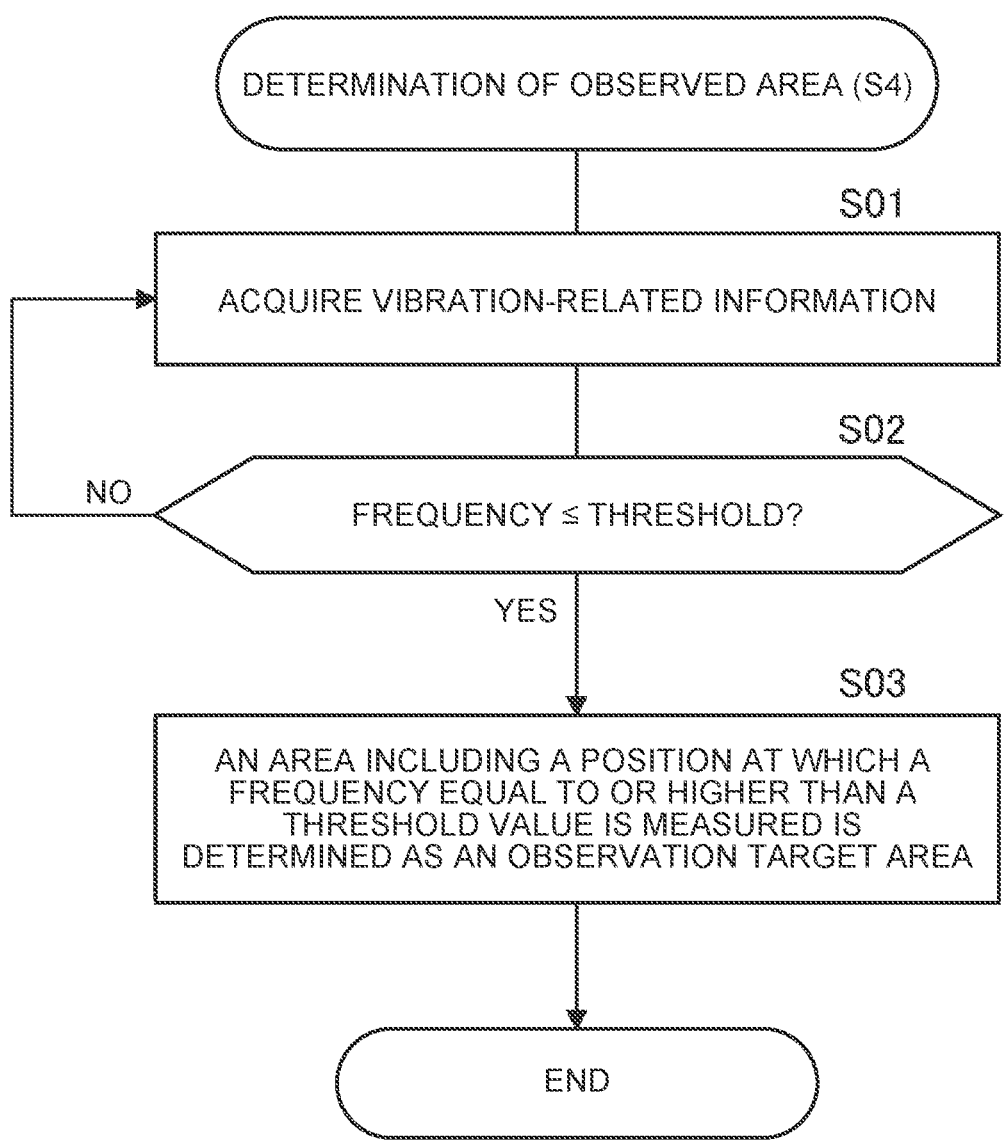
FIG. 5 is a flowchart illustrating an example of processing for determining an observation target region.

The processor 21 of the information processing device 2 performs a process of determining an observation target region (step S4). FIG. 5 is a flowchart illustrating an example of processing for determining an observation target region. In step S01, the processor 21 of the information processing device 2 acquires vibration-related information. In the present embodiment, information indicating the frequency of the vehicle 3 included in the vibration-related information is read from the storage device 22.

In step S02, the processor 21 determines whether or not the frequency is equal to or higher than a threshold value (predetermined frequency) prepared in advance. At this time, if it is determined that the frequency is equal to or greater than the threshold value, the process proceeds to step S03, and if not, the process returns to step S01.

In step S03, the processor 21 determines the measurement position of the frequency, that is, the area 10 including the position on the road 6 where the vehicle 3 has measured the frequency (that is, the road 6) as the observation target area.

Returning to FIG. 4, the processor 21 of the information processing device 2 transmits an observation instruction (command) of the area 10 corresponding to the observation target area to the artificial satellite 4 (step S5). The artificial satellite 4 generates observation data for the area 10 designated in the observation instruction in response to the observation instruction from the information processing device 2. That is, the artificial satellite 4 generates image data (data observed by the artificial satellite 4, that is, observation data) indicating the shape of the ground surface of the area 10 using the SAR, and transmits the observation data to the information processing device 2 (step S6).

Figure 6:
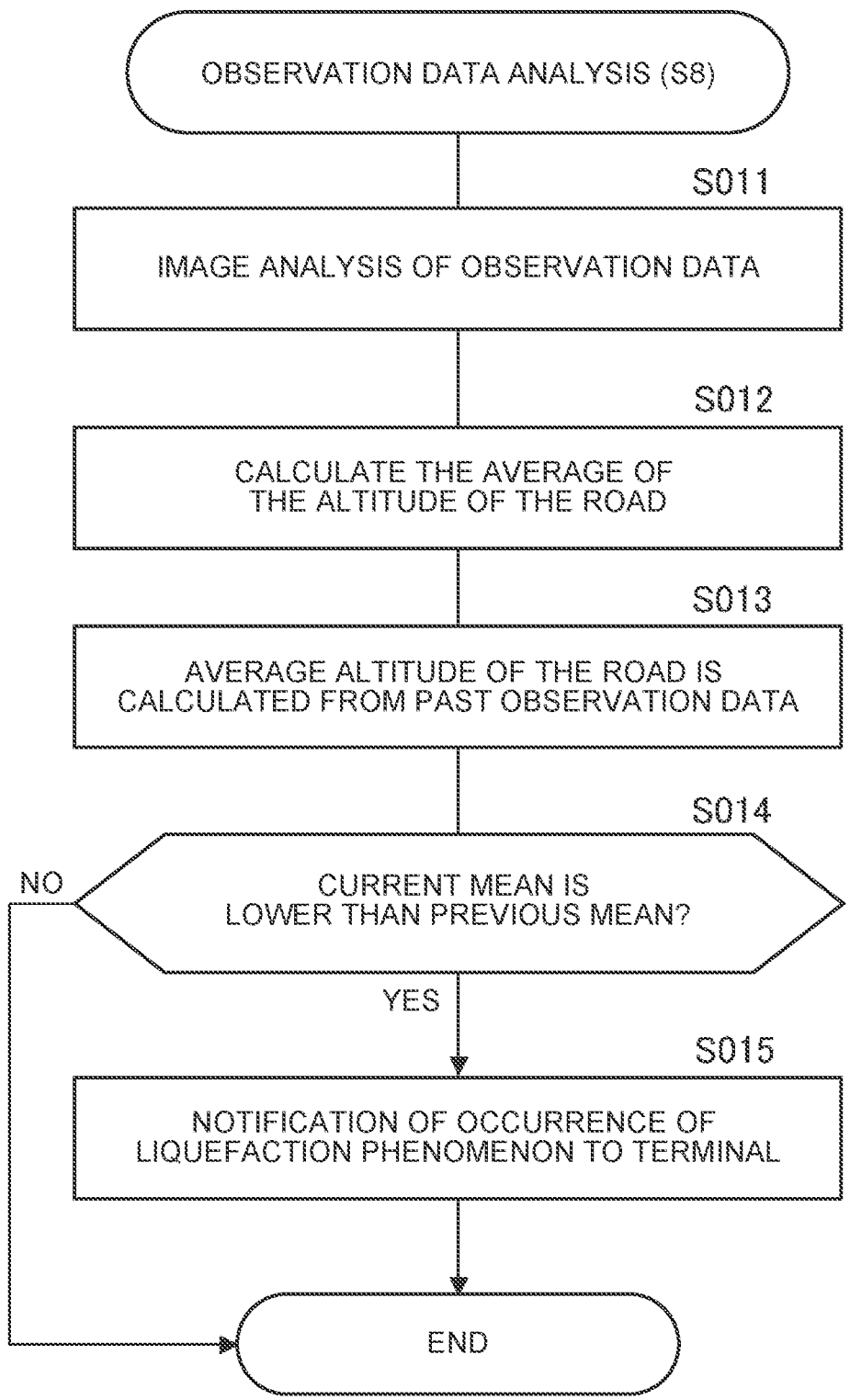
FIG. 6 is a flowchart illustrating an example of an analysis process.

The processor 21 of the information processing device 2 stores the observation data received from the artificial satellite 4 in the storage device 22 (an example of a storage unit) (step S7). The processor 21 analyzes the observation data, that is, the image data (step S8). FIG. 6 is a flowchart illustrating an example of an analysis process. In the step S011, the processor 21 of the information processing device 2 analyzes the image data and identifies the road 6 in the image.

In S012 of steps, the processor 21 determines the height of each point of the road 6 (the average of the altitude, referred to as the present average value). In the step S013, the processor 21 acquires data (previously stored in the storage device 22) measured in the past with respect to the area 10 (the road 6), and calculates an average value (referred to as a past average value) of the altitude of the road 6 from the past data.

In the step S014, the processor 21 compares the current average value with the past average value, and determines whether the current average value is lower than the past average value. When a liquefaction phenomenon occurs, the entire generated region tends to subside and the altitude of the region tends to decrease. If it is determined that the current average value has decreased, the process proceeds to step S015, otherwise the process of FIG. 6 ends.

In the step S015, the processor 21 executes a process of transmitting a notification (liquefaction phenomenon occurrence notification) including information indicating occurrence of a liquefaction phenomenon to the terminal 5, and ends the process of FIG. 6.

Returning to FIG. 4, when the information processing device 2 determines that a liquefaction phenomenon has occurred through the processing of FIG. 6 (Y in step S9), it transmits a liquefaction phenomenon occurrence notification (step S10). The liquefaction phenomenon occurrence notification is received by the terminal 5 for management of the road 6.

The processor 21 of the terminal 5 executes a process of outputting, from the output device 25, information indicating the occurrence of the liquefaction phenomenon included in the liquefaction phenomenon occurrence notification (step S11). As a result, the occurrence of the liquefaction phenomenon is notified to the administrator of the road 6 using the terminal 5, and the administrator can take appropriate measures.

According to the information processing device 2 according to the embodiment, the processor 21 as a control unit determines an observation target region to be observed by the artificial satellite 4 on the basis of information on vibration during traveling of the vehicle 3. Further, the processor 21 determines whether or not a liquefaction phenomenon has occurred based on the data obtained by observing the observation target region by the artificial satellite 4.

As described above, the information processing device 2 detects a portion where the liquefaction phenomenon is likely to occur based on the information on the vibration acquired from the vehicle 3 (which may be other than the vehicle 3). Then, the information processing device 2 determines whether or not a liquefaction phenomenon has occurred by using data obtained by observing the corresponding portion by the artificial satellite 4. The frequency is grasped from the information on the vibration obtained from the vehicle 3. However, the absolute value (altitude) of the height of the road surface is not known. Therefore, it is not possible to distinguish whether the frequency indicates softening of asphalt or occurrence of liquefaction phenomenon. As in the present embodiment, by using the observation data of the artificial satellite 4, it is possible to determine whether the frequency indicates the occurrence of the liquefaction phenomenon or is caused by other than the liquefaction phenomenon such as softening of the road surface asphalt.

In the embodiment, the information processing device 2 determines whether or not a liquefaction phenomenon has occurred based on a comparison between past data obtained by observing the observation target region by the artificial satellite 4 and current data. As described above, it is possible to determine that the height of the road surface is lowered by comparing the observation data with the past observation data, and it is possible to determine that the liquefaction phenomenon has occurred based on the determination result.

In the embodiment, when the information on the vibration includes the information indicating the occurrence of the liquefaction phenomenon, the information processing device 2 determines the region including the road 6 on which the vehicle 3 travels as the observation target region. In this way, in a case where the vibration during traveling of the vehicle 3 is the vibration corresponding to the liquefaction phenomenon, it can be determined that there is a possibility that the liquefaction phenomenon has occurred in the region (area 10) where the vibration has occurred. Then, the occurrence of the liquefaction phenomenon can be easily or suitably detected by scrutinizing the corresponding region using the observation data of the artificial satellite 4.

In the embodiment, the information processing device 2 determines a region including a road on which the vehicle 3 has traveled as an observation target region when the information on the vibration includes information indicating the frequency of the vehicle 3 that is equal to or greater than a predetermined number (threshold value). Since the frequency of the vehicle 3 increases in the region where the liquefaction phenomenon occurs, it can be determined that there is a possibility that the liquefaction phenomenon occurs when the frequency of the vehicle 3 becomes equal to or higher than the threshold.

In the embodiment, the information processing device 2 acquires, as information on vibration, information on the frequency of the damper of the vehicle 3 and position information on the vehicle 3. The frequency of the damper of the vehicle 3 correlates with the state of the road 6. Therefore, it is possible to determine the possibility that a liquefaction phenomenon has occurred based on the frequency of the damper of the vehicle 3. In addition, a position (point) at which a liquefaction phenomenon is likely to occur can be identified from the position information of the vehicle 3.

In the embodiment, when it is determined that the liquefaction phenomenon has occurred, the information processing device 2 transmits the determination result to the terminal 5 for road management. This makes it possible to notify the administrator of the road 6 of the occurrence of the liquefaction phenomenon. The administrator can quickly respond to the liquefaction phenomenon.

In the embodiment, the artificial satellite 4 uses an artificial satellite equipped with an SAR. As a result, it is possible to obtain image data of an observation target region that is suitable regardless of weather. In SAR, the height of the road surface is known, but the rigidity and deflection of the road surface are not known. By combining the vibration-related information of the vehicle 3 and the observation data of the artificial satellite 4, it is possible to suitably detect the liquefaction phenomenon.

Further, the storage device 22 of the information processing device 2 operates as a storage unit that stores data observed by the artificial satellite 4. Thus, the observation data can be stored and used as past observation data.

Modified Example

In the embodiment, the information processing device 2 can acquire the information correlated with the deformation of the road 6 and the position information of the vehicle 3 as the information related to the vibration. The following describes a case where an abnormality (information on irregularities, referred to as irregularity-related information) of the road 6 is acquired as information correlated with the deformation of the road 6.

Figure 7:
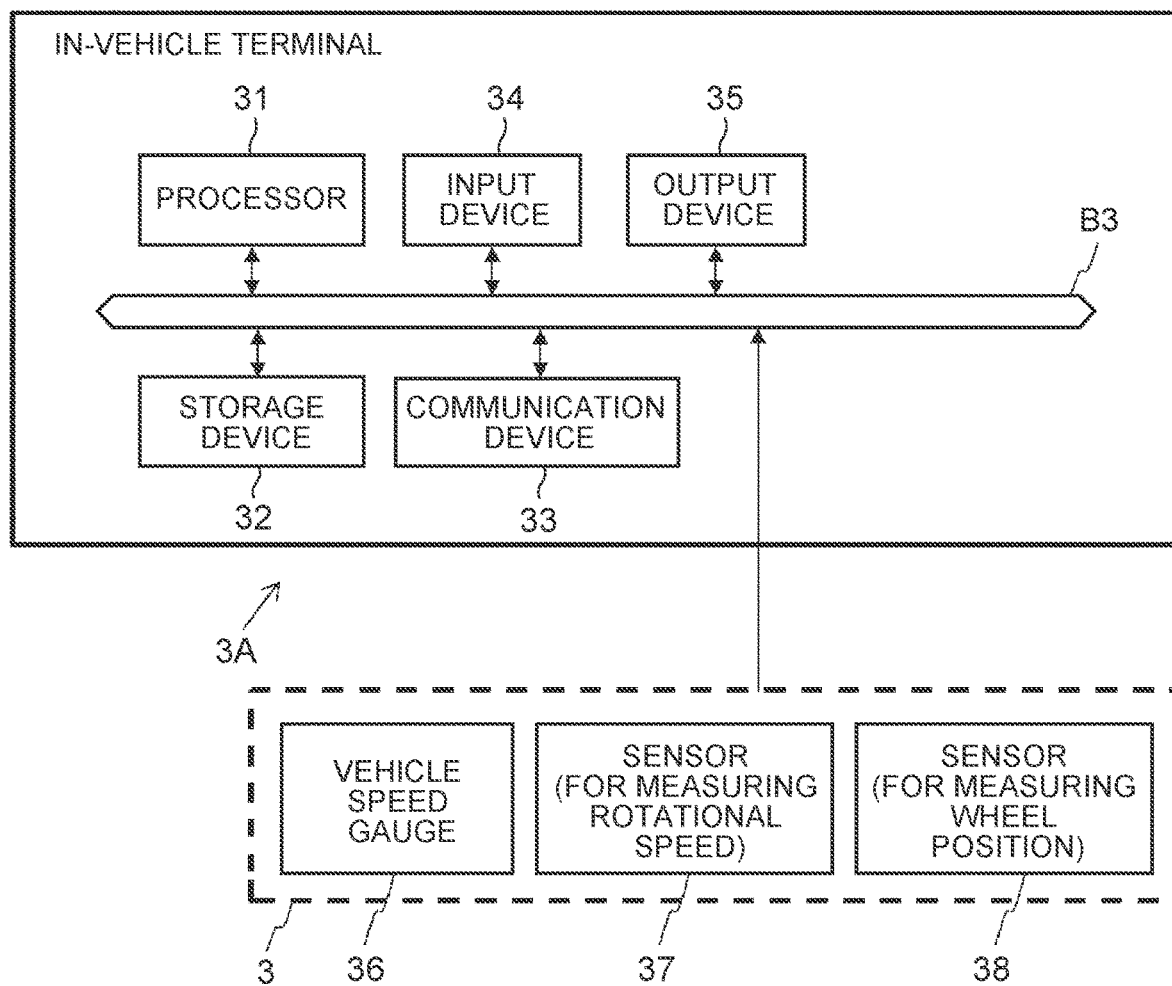
FIG. 7 is an explanatory diagram of a modified example.

As an example, the unevenness-related information may include vehicle speed information, rotation speed information, and wheel position information. FIG. 7 is an explanatory diagram of a modified example. In the modification, the information from the vehicle speed gauge 36, the sensor 37, and the sensor 38 is inputted to the in-vehicle terminal 3A instead of the information from the sensor 40.

The vehicle speed gauge 36 measures a vehicle speed that is a speed of the vehicle 3. For example, the vehicle speed gauge 36 calculates the vehicle speed from the rotational speed of the output shaft of the transmission measured by the sensor. The sensor 37 is a sensor that measures the rotational speed of each wheel (four wheels, two in front and two in rear in the present embodiment) included in the vehicle 3. The sensor 38 measures wheel position information indicating a position of each wheel included in the vehicle 3 on the ground surface. The wheel position information can be acquired by calculating the position of the wheel on the ground surface based on the current position and the direction of the vehicle 3 and the sizes of the tread, the wheel base, and the wheels of the vehicle 3. The present position and the direction (traveling direction) of the vehicle 3 can be acquired using, for example, a Global Positioning System (GPS) function included in the vehicle 3. As a method of measuring the rotational speed and a method of acquiring the wheel position information, any existing method can be applied.

In a modification, the vibration-related information transmitted from the in-vehicle terminal 3A to the information processing device 2 in step S2 of FIG. 4 includes concavo-convex-related information (vehicle speed information, rotational speed information, and wheel position information). FIG. 8 is a flowchart illustrating a determination process (step S4) of an observation target measurement region in a modification example.

In FIG. 8, the processor 21 of the information processing device 2 acquires rotational speed information, vehicle speed information, and wheel position information (step S021). In S022 of steps, the processor 21 determines the unevenness of the road surface of the road 6.

That is, the processor 21 detects a malfunction (abnormality) of the road 6 on which the vehicle 3 is traveling based on the vibration-related information received from each vehicle 3. Specifically, the processor 21 calculates the estimated rotational speed of the wheel based on the vehicle speed indicated by the vehicle speed information included in the vibration-related information and the size of the wheel.

Then, the processor 21 detects a malfunction of the road 6 based on the estimated rotation speed and the rotation speed information. At this time, when the difference between the estimated rotational speed and the rotational speed indicated by the rotational speed information exceeds the predetermined first threshold value, the processor 21 detects that there is an abnormality (predetermined unevenness) on the road surface of the road 6. Alternatively, the processor 21 detects that there is an abnormality (a predetermined unevenness) on the road surface of the road 6 when the difference between the rotational speeds of the plurality of wheels provided in the vehicle 3 exceeds a predetermined second threshold value. Then, the processor 21 specifies the position of the ground surface indicated by the wheel position information when the abnormality is detected as the position information of the portion (referred to as the unevenness generation portion) where the unevenness of the observation target is generated.

Note that the predetermined unevenness may be detected as follows. That is, the processor 21 calculates an estimated delay time from when the front wheels of the vehicle 3 pass to when the rear wheels pass by using the vehicle speed and the length of the wheel base. The processor 21 may determine that the wheel has descended from the step or ascended the step when there is a change in the rotational speed of the wheel that is not caused by a similar change in the vehicle speed for the rear wheel and the front wheel after the estimated time has elapsed. Lowering or raising the step means that there are irregularities (depressions 7 or ridges 8). Then, the processor 21 calculates the difference between the estimated rotational speed of the wheel and the actual rotational speed as the variation amount, and converts the variation amount into the height of the step. Then, when the height (absolute value) of the step is larger than the threshold value, the processor 21 determines the position where the step is detected as the position where the unevenness of the observation target is present.

In the step S023, the processor 21 determines the area 10 including the position determined as the predetermined uneven position as the observation target area. Except for the above, the modification examples are the same as those of the embodiment, and therefore, repeated description thereof will be omitted.

The occurrence of the liquefaction phenomenon changes the mode of deformation of the road when the vehicle 3 travels. This deformation of the road changes the frequency of the vehicle 3. Therefore, when the liquefaction phenomenon occurs, the observation target region can be determined based on information (unevenness-related information) correlated with the deformation of the road.

The above-described embodiment is merely an example, and the present disclosure may be appropriately modified and implemented without departing from the scope thereof. For example, the processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiments, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing device comprising:
a memory; and
one or more processors configured to:
transmit a request of information on vibration during traveling of a vehicle to an in-vehicle terminal,
the in-vehicle terminal being configured to receive the information from a sensor mounted on a damper of the vehicle, the sensor measuring a frequency of the damper,
the information including the frequency of the damper of the vehicle and a position on a road at which the frequency is measured,
the sensor being configured to measure the frequency of the vehicle;
receive the information from the in-vehicle terminal which receive the request;
decide a region including a position as an observation target region to be observed by an artificial satellite in a case where the frequency is equal to or higher than a threshold value;
transmit an observation instruction of the observation target region to the artificial satellite;
store a first image data transmitted from the artificial satellite in the memory, the first image data comprising absolute height data of a surface of the road,
the first image data being generated by observing, with a synthetic aperture radar (SAR), the observation target region by the artificial satellite which received the observation instruction;
analyze the first image data and identify a road in the first image data;

calculate an average value of a first altitude of the road in the first image data;
acquire a second image data measured in the past with respect to the road from the memory;
calculate an average value of a second altitude of the road in the second image data;
determine that a liquefaction phenomenon has occurred in a case where the average value of the first altitude of the road is lower than the average value of the second altitude of the road;
transmit the first image data including the position on the road to a management terminal of the road in a case where the one or more processors determine that the liquefaction phenomenon has occurred; and
cause a display of the management terminal to display the position on the road.

2. An information processing method comprising:
transmitting a request of information on vibration during traveling of a vehicle to an in-vehicle terminal,
the in-vehicle terminal being configured to receive the information from a sensor mounted on a damper of the vehicle, the sensor measuring a frequency of the damper,
the information including the frequency of the damper of the vehicle and a position on a road at which the frequency is measured,
the sensor being configured to measure the frequency of the vehicle;
receiving the information from the in-vehicle terminal which receive the request;
deciding a region including a position, by an information processing device, as an observation target region to be observed by an artificial satellite
transmitting an observation instruction of the observation target region to the artificial satellite;
storing a first image data transmitted from the artificial satellite in the memory, the first image data comprising absolute height data of a surface of the road,
the first image data being generated by observing, with a synthetic aperture radar (SAR), the observation target region by the artificial satellite which received the observation instruction;
analyzing the first image data and identify a road in the first image data;
calculating an average value of a first altitude of the road in the first image data;
acquiring a second image data measured in the past with respect to the road from the memory;
calculating an average value of a second altitude of the road in the second image data;
determining, by the information processing device, that a liquefaction phenomenon has occurred in a case where the average value of the first altitude of the road is lower than the average value of the second altitude of the road;
transmitting the first image data including the position on the road to a management terminal of the road in a case where the one or more processors determine that the liquefaction phenomenon has occurred; and
causing a display of the management terminal to display the position on the road.

3. A non-transitory storage medium storing instructions that are executable by one or more processors and that cause the one or more processors to perform functions comprising:
a step of transmitting a request of information on vibration during traveling of a vehicle to an in-vehicle terminal,
the in-vehicle terminal being configured to receive the information from a sensor mounted on a damper of the vehicle, the sensor measuring a frequency of the damper,
the information including the frequency of the damper of the vehicle and a position on a road at which the frequency is measured,
the sensor being configured to measure the frequency of the vehicle;
a step of receiving the information from the in-vehicle terminal which receive the request;
a step of deciding a region including a position, by an information processing device, as an observation target region to be observed by an artificial satellite
a step of transmitting an observation instruction of the observation target region to the artificial satellite;
a step of storing a first image data transmitted from the artificial satellite in the memory, the first image data comprising absolute height data of a surface of the road,
the first image data being generated by observing, with a synthetic aperture radar (SAR), the observation target region by the artificial satellite which received the observation instruction;
a step of analyzing the first image data and identify a road in the first image data;
a step of calculating an average value of a first altitude of the road in the first image data;
a step of acquiring a second image data measured in the past with respect to the road from the memory;
a step of calculating an average value of a second altitude of the road in the second image data;
a step of determining, by the information processing device, that a liquefaction phenomenon has occurred in a case where the average value of the first altitude of the road is lower than the average value of the second altitude of the road;
a step of transmitting the first image data including the position on the road to a management terminal of the road in a case where the one or more processors determine that the liquefaction phenomenon has occurred; and
a step of causing a display of the management terminal to display the position on the road.

* * * * *